US011429860B2

(12) United States Patent
Li et al.

(10) Patent No.: US 11,429,860 B2
(45) Date of Patent: Aug. 30, 2022

(54) LEARNING STUDENT DNN VIA OUTPUT DISTRIBUTION

(71) Applicant: Microsoft Technology Licensing, LLC, Redmond, WA (US)

(72) Inventors: Jinyu Li, Redmond, WA (US); Rui Zhao, Beijing (CN); Jui-Ting Huang, Menlo Park, CA (US); Yifan Gong, Sammamish, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 1024 days.

(21) Appl. No.: 14/853,485

(22) Filed: Sep. 14, 2015

(65) Prior Publication Data
US 2016/0078339 A1 Mar. 17, 2016

(51) Int. Cl.
*G06N 3/08* (2006.01)
*G06N 20/00* (2019.01)
(Continued)

(52) U.S. Cl.
CPC ........... *G06N 3/084* (2013.01); *G06N 3/0454* (2013.01); *G06N 3/082* (2013.01); *G06N 7/005* (2013.01); *G06N 20/00* (2019.01); *G09B 5/00* (2013.01)

(58) Field of Classification Search
None
See application file for complete search history.

(56) References Cited

U.S. PATENT DOCUMENTS 7,280,987 B2 10/2007 Chen et al.
7,444,282 B2 10/2008 Choo et al.
(Continued)

FOREIGN PATENT DOCUMENTS

CN 103400577 A 11/2013
CN 103456299 A 12/2013
(Continued)

OTHER PUBLICATIONS

Ba, L.J. et al., "Do deep nets really need to be deep?" as posted to arxiv.org <arxiv.org/abs/1312.6184v5> on Feb. 21, 2014, 6 pp.*
(Continued)

*Primary Examiner* — Brian M Smith
(74) *Attorney, Agent, or Firm* — Shook, Hardy & Bacon L.L.P.

(57) ABSTRACT

Systems and methods are provided for generating a DNN classifier by "learning" a "student" DNN model from a larger more accurate "teacher" DNN model. The student DNN may be trained from un-labeled training data because its supervised signal is obtained by passing the un-labeled training data through the teacher DNN. In one embodiment, an iterative process is applied to train the student DNN by minimize the divergence of the output distributions from the teacher and student DNN models. For each iteration until convergence, the difference in the output distributions is used to update the student DNN model, and output distributions are determined again, using the unlabeled training data. The resulting trained student model may be suitable for providing accurate signal processing applications on devices having limited computational or storage resources such as mobile or wearable devices. In an embodiment, the teacher DNN model comprises an ensemble of DNN models.

20 Claims, 7 Drawing Sheets

(51) Int. Cl.
G06N 3/04 (2006.01)
G06N 7/00 (2006.01)
G09B 5/00 (2006.01)

(56) References Cited

U.S. PATENT DOCUMENTS

| 7,613,665 | B2 | 11/2009 | Chen et al. |
| 7,835,910 | B1 | 11/2010 | Hakkani-Tur et al. |
| 9,653,093 | B1 * | 5/2017 | Matsoukas ............. G10L 15/08 |
| 2014/0164299 | A1 | 6/2014 | Sainath et al. |
| 2014/0201126 | A1 | 7/2014 | Zadeh et al. |

FOREIGN PATENT DOCUMENTS

| CN | 103544705 A | 1/2014 |
| CN | 103886305 A | 6/2014 |
| CN | 103945533 A | 7/2014 |
| CN | 103955702 A | 7/2014 |
| RU | 2418321 C2 | 11/2009 |
| TW | 201430830 A | 8/2014 |
| WO | 2014114116 A1 | 7/2014 |

OTHER PUBLICATIONS

Benesty, M. "How many layers are required to be called deep neural network?" downloaded from quora.com <www.quora.com/How-many-layers-are-required-to-be-called-deep-neural-network? posted Dec. 20, 2015, 1 pg.*
Li, J et al., "Learning small-size DNN with output-distribution-based criteria" posted to Microsoft Research on Sep. 1, 2014 <https://www.microsoft.com/en-US/research/publication/learning-small-size-dnn-with-output-distribution-based-criteria/>, 5 pp.*
Rumelhart, D. et al., "Learning representations by back-propagating errors," Nature, vol. 323 (Oct. 9, 1986) pp. 533-536.*
Schwenk, H. et al., "Boosting neural networks," Neural Computation vol. 12, No. 8 (2000) pp. 1869-1887.*
Seide, F. et al., "Conversational speech transcription using context-dependent deep neural networks," Interspeech 2011, pp. 437-440.*
Hopper, T., blog post entitled "Cross Entropy and KL Divergence," blog post at <tdhopper.com/blog/cross-entropy-and-kl-divergence>, posted Sep. 4, 2015.*
Tan, Z. H. et al., "Network, distributed and embedded speech recognition: An overview," Chapter 1 in "Automatic Speech Recognition on Mobile Devices and over Communication Networks," Springer (2008) 408 pp. (Year: 2008).*
Van Der Maaten, L. et al, "Visualizing data using t-SNE," Journal of Machine Learning Research, vol. 9 (2008) pp. 2579-2605. (Year: 2008).*
Dean, J. et al., "Large scale distributed deep networks," Advances in Neural Information Processing Systems (NIPS 2012) 9 pp. (Year: 2012).*
Oquab, M. et al., "Learning and Transferring Mid-Level Image Representations using Convolutional Neural Networks," 2014 IEEE Conf. on Computer Vision and Pattern Recognition (Jun. 2014) pp. 1717-1724. (Year: 2014).*
Yu, et al., "Roles of Pre-Training and Fine-Tuning in Context-Dependent DBN-HMMs for Real-World Speech Recognition", In Proceedings of workshop on Deep Learning and Unsupervised Feature Learning, Dec. 2010, 8 pages.
Sainath, et al., "Making Deep Belief Networks Effective for Large Vocabulary Continuous Speech Recognition", In Proceedings of IEEE Workshop on Automatic Speech Recognition & Understanding, Dec. 11, 2011, 6 pages.
Dahl, et al., "Context-Dependent Pre-Trained Deep Neural Networks for Large-Vocabulary Speech Recognition", In Proceedings of IEEE Transactions on Audio, Speech & Language Processing, vol. 20, No. 1, Jan. 2012, 13 pages.
Jaitly, et al., "Application of Pretrained Deep Neural Networks to Large Vocabulary Speech Recognition", In Proceedings of 13th Annual Conference of the International Speech Communication Association, Sep. 9, 2012, 4 pages.
Hinton, et al., "Deep Neural Networks for Acoustic Modeling in Speech Recognition", In Proceedings of IEEE Signal Processing Magazine, vol. 29, No. 6, Nov. 2012, 27 pages.
Deng, et al., "Recent Advances in Deep Learning for Speech Research at Microsoft", In Proceedings of IEEE International Conference on Acoustics, Speech and Signal Processing, May 26, 2013, 5 pages.
Sainath, et al., "Low-Rank Matrix Factorization for Deep Neural Network Training with High-Dimensional Output Targets", In Proceedings of IEEE International Conference on Acoustics, Speech and Signal Processing, May 26, 2013, 5 pages.
Xue, et al., "Restructuring of Deep Neural Network Acoustic Models with Singular Value Decomposition", In Proceedings of 14th Annual Conference of the International Speech Communication Association, Aug. 25, 2013, 5 pages.
Vanhoucke, et al., "Improving the Speed of Neural Networks on CPUs", In Proceedings of Deep Learning and Jnsupervised Feature Learning Workshop, Dec. 2011, 8 pages.
Vanhoucke, et al., "Multiframe Deep Neural Networks for Acoustic Modeling", In Proceedings of IEEE International Conference on Acoustics, Speech and Signal Processing, May 26, 2013, 4 pages.
Lei, et al., "Accurate and Compact Large Vocabulary Speech Recognition on Mobile Devices", In Proceedings of 14th Annual Conference of the International Speech Communication Association, Aug. 25, 2013, 4 pages.
Bucila, et al., "Model Compression", In Proceedings of the Twelfth Acm Sigkdd International Conference on Knowledge Discovery and Data Mining, Aug. 20, 2006, 7 pages.
Young, et al., "Tree-based State Tying for High Accuracy Acoustic Modelling", In Proceedings of the workshop on Human Language Technology, Mar. 8, 1994, 6 pages.
Heigold, et al., "Equivalence of Generative and Log-Linear Models", In Proceedings of IEEE Transactions on Audio, Speech & Language Processing, vol. 19, No. 5, Jul. 2011, 11 pages.
Su, et al., "Error Back Propagation for Sequence Training of Context-Dependent Deep Networks for Conversational Speech Transcription", In Proceedings of IEEE International Conference on Acoustics, Speech and Signal Processing, May 26, 2013, 5 pages.
Xue, et al., "Singular Value Decomposition Based Low-Footprint Speaker Adaptation and Personalization for Deep Neural Network", In Proceedings of IEEE International Conference on Acoustics, Speech and Signal Processing, May 34, 2014, 5 pages.
Yu, et al., "KL-Divergence Regularized Deep Neural Network Adaptation for Improved Large Vocabulary Speech Recognition", In Proceedings of IEEE International Conference on Acoustics, Speech and Signal Processing, May 26, 2013, 5 pages.
Maas, et al., "Increasing Deep Neural Network Acoustic Model Size for Large Vocabulary Continuous Speech Recognition", In Proceedings of the Computing Research Repository, Jun. 2014, 5 pages.
Zhou, et al., "A Cluster-Based Multiple Deep Neural Networks Method for Large Vocabulary Continuous Speech Recognition", In Proceedings of IEEE International Conference on Acoustics, Speech and Signal Processing, May 26, 2013, 5 pages.
Vu, et al., "Multilingual Deep Neural Network Based Acoustic Modeling for Rapid Language Adaptation", In Proceedings of IEEE International Conference on Acoustics, Speech and Signal Processing, May 4, 2014, 5 pages.
International Search Report with Written Opinion dated May 27, 2015 in Application No. PCT/CN2014/086397, 11 pages.
"Office Action Issued in European Patent Application No. 14901677.6", dated Jan. 26, 2018, 6 pages.
Dauphin, et al., "Identifying and Attacking the Saddle Point Problem in High-dimensional Non-convex Optimization", In Proceedings of the Advances in Neural Information Processing Systems, Jun. 10, 2014, 14 Pages.
Kinzel, et al., "Theory of Interacting Neural Networks", In Handbook of Graphs and Networks: From the Genome tot he Internet, Nov. 8, 2002, 21 Pages.
"Supplementary European Search Report Issued in European Patent Application No. 14901677.6", dated Dec. 19, 2017, 5 Pages.

(56) References Cited

OTHER PUBLICATIONS

"Notice of Allowance Issued in Russian Patent Application No. 2017107352", dated Jul. 10, 2018, 19 Pages.
"Office Action Issued in Chinese Patent Application No. 201480068343.X", dated Apr. 10, 2019, 11 Pages.
"Office Action Issued in Japanese Patent Application No. 2017-513728", dated Mar. 29, 2019, 6 Pages.
"Office Action Issued in Chinese Patent Application No. 201480068343.X", dated Oct. 8, 2018, 13 Pages.
"Office Action Issued in Japanese Patent Application No. 2017-513728", dated Aug. 30, 2018, 5 Pages.
Diresan, et al., "Multi-Column Deep Neural Network For Traffic Sign Classification", Retrieved From: https://www.sciencedirect.com/science/article/pii/S0893608012000524, Aug. 2012, 15 Pages.
"Third Office Action Issued in Chinese Patent Application No. 201480068343.X", dated Oct. 9, 2019, 16 Pages.
Yu, et al., "The Deep Tensor Neural Network With Applications to Large Vocabulary Speech Recognition", In Proceedings of IEEE Transactions on Audio, Speech, And Language Processing, vol. 21, Issue 2, Feb. 2013, pp. 388-396.
"Office Action Issued in Brazilian Patent Application No. 1120170038935", dated Mar. 23, 2020, 5 Pages.
"Summon to Attend Oral Proceedings Issued in European Patent Application No. 14901677.6", dated Mar. 16, 2020, 8 Pages.
"Fourth Office Action issued in Chinese Patent Application No. 201480068343.X", dated Jun. 2, 2020, 11 Pages.

* cited by examiner

LEARNING STUDENT DNN VIA OUTPUT DISTRIBUTION

CROSS-REFERENCE TO RELATED APPLICATIONS

This application is a continuation of and claims the benefit of International Application No. PCT/CN2014/086397, titled "Learning Student DNN via Output Distribution," filed Sep. 12, 2014, which is hereby expressly incorporated by reference in its entirety.

BACKGROUND

Deep neural network (DNN) promises significant accuracy improvements for complex signal processing applications including speech recognition and image processing. The power of DNN comes from its deep and wide network structure having a very large number of parameters. For example, context-dependent deep neural network hidden Markov model (CD-DNN HMM) has been shown to outperform the conventional Gaussian mixture model (CD-GMM-HMM) on many automatic speech recognition (ASR) tasks. However, the outstanding performance of CD-DNN-HMMs comes with much higher runtime costs because DNNs use much more parameters than the traditional systems. Thus, while CD-DNN-HMMs have been deployed with high accuracy on servers or other computer systems having ample computational and storage resources, it becomes challenging to deploy DNN on devices that have limited computational and storage resources, such as smart phones, wearable devices, or entertainment systems.

Yet, given the prevalence of such devices and the potential benefits DNN presents to applications such as ASR and image processing, the industry has a strong interest to have DNN on these devices. A common approach to this problem is to reduce the dimensions of the DNN, for example, by reducing the number of nodes in hidden layers and the number of senone targets in the output layer. But although this approach reduces the DNN model size, accuracy loss (e.g. word error rate) increases significantly and performance quality suffers.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Embodiments of the invention are directed to systems and methods for providing a more accurate DNN model of reduced size for deployment on devices by "learning" the deployed DNN from a DNN with larger capacity (number of hidden nodes). To learn a DNN with a smaller number of hidden nodes, a larger size (more accurate) "teacher" DNN is used to train the smaller "student" DNN. In particular, as will be further described, an embodiment of the invention utilizes the property of DNN output distribution by minimizing the divergence between the output distributions of a small-sized student DNN and a standard (or larger-size) teacher DNN, using un-labeled data, such as un-transcribed data. The student DNN may be trained from un-labeled (or un-transcribed) data because its supervised signal is obtained by passing un-labeled training data through the teacher DNN. Without the need for transcribed (or labeled) training data, much more data becomes available for training, thereby further improving the accuracy of the student to provide a better approximation of complex functions from the large-size teacher DNN. The student DNN may be iteratively optimized until its output converges with the output of the teacher DNN. In this way, the student DNN approaches the behavior of the teacher, so that whatever the output of the teacher, the student will approximate, even where the teacher may be wrong. An embodiment of the invention is thus particularly suitable for providing accurate signal processing applications (e.g. ASR or image processing), on smart phones, entertainment systems, or similar consumer electronics devices.

Some embodiments of the invention include providing a more accurate DNN model (e.g., small or standard size) by learning the DNN model from an even larger "giant" teacher DNN. For example, a standard-size DNN model for deployment on a server can be generated using the teacher-student learning procedures described herein, wherein student DNN is the standard-sized DNN model and the teacher DNN is a giant size DNN, which might be implemented as trained ensemble of multiple DNNs with different error patterns. In an embodiment, the ensemble is trained by combining the ensemble member outputs with automatically learned combination coefficients using, for example, cross-entropy criterion, sequential criterion, least square error criterion, least square error criterion with nonnegative constraint, or similar criteria.

BRIEF DESCRIPTION OF THE DRAWINGS

The present invention is illustrated by way of example and not limitation in the accompanying figures in which like reference numerals indicate similar elements and in which.

DETAILED DESCRIPTION

Figure 1:
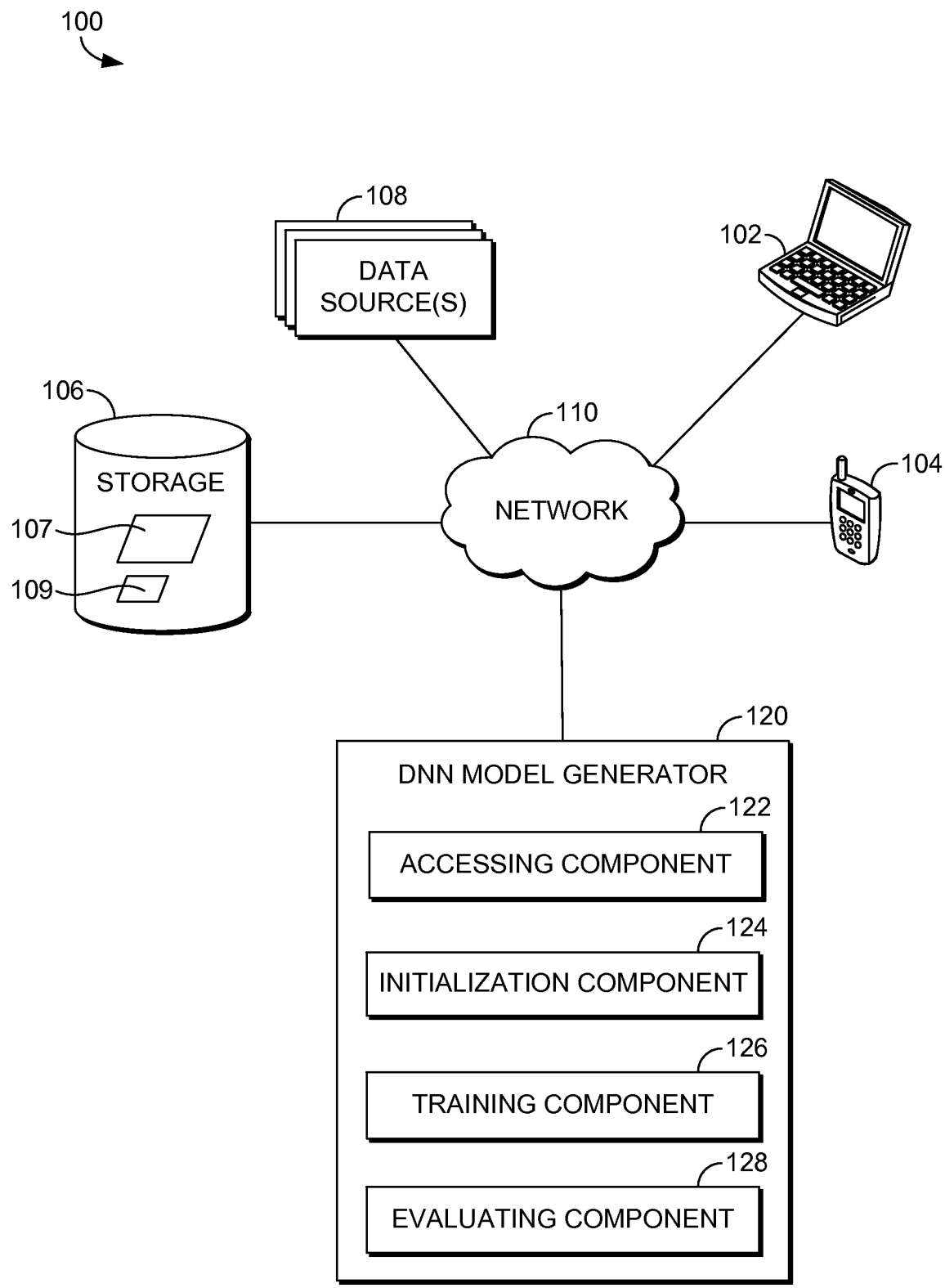
FIG. 1 is a block diagram of an example system architecture in which an embodiment of the invention may be employed.

The subject matter of the present invention is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

Various aspects of the technology described herein are generally directed to among other things, systems, methods, and computer-readable media for providing a first DNN model of reduced size for deployment on devices by "learning" the first DNN from a second DNN with larger capacity (number of hidden nodes). To learn a DNN with a smaller number of hidden nodes, a larger size (more accurate) "teacher" DNN is used for training the smaller "student" DNN. In particular, an embodiment of the invention utilizes the property of DNN output distribution by minimizing the divergence between the output distributions of a small-sized student DNN and a standard (or larger-size) teacher DNN, using un-labeled data, such as un-transcribed data. The student DNN can be trained from un-labeled (or un-transcribed) data because its supervised signal is obtained by passing the un-labeled training data through the teacher DNN. Without the need for transcribed (or labeled) training data, much more data becomes available for training, thereby further improving the accuracy of the student to provide a better approximation of complex functions from the large-size teacher DNN.

As will be further described, in one embodiment, the student DNN is iteratively optimized until its output converges with the output of the teacher DNN. In this way, the student DNN approaches the behavior of the teacher, so that whatever the output of the teacher, the student will approximate, even where the teacher may be wrong. Some embodiments of the invention are thus particularly suitable for providing accurate signal processing applications (e.g. ASR or image processing), on smart phones, entertainment systems, or similar consumer electronics devices. Further, some of these embodiments of the invention may be combined with other technologies to further improve the runtime performance of CD-DNN-HMMs, such as low rank matrices used at the output layers or all layers to further reduce the number of parameters and CPU cost, 8-bit quantization for SSE (Streaming SIMD Extensions) evaluation, and/or frame skipping or prediction technologies.

In some embodiments of the invention, a deployable DNN model (e.g., small or standard sized model) is determined by learning the deployable DNN model from an even larger "giant" teacher DNN. For example, a standard-size DNN model for deployment on a server (or a smaller-sized DNN for deployment on a mobile device) can be generated using the teacher-student learning procedures described herein, wherein the student DNN is the standard-sized DNN model (or smaller-sized DNN model) and the teacher DNN is a giant size DNN. The giant size DNN may be implemented as a trained ensemble of multiple DNNs with different error patterns, in an embodiment. The ensemble may be trained by combining the ensemble member outputs with automatically learned combination coefficients using, for example, cross-entropy criterion, sequential criterion, least square error criterion, least square error criterion with nonnegative constraint, or similar criteria.

As described above, an advantage of some embodiments described herein is that the student DNN model may be trained using un-labeled (or un-transcribed data) because its supervised signal ($P_L(s|x)$, as will be further described) is obtained by passing the un-labeled training data through the teacher DNN model. Because labeling (or transcribing) data for training costs time and money, a much smaller amount of labeled (or transcribed) data is available as compared to un-labeled data. Without the need for transcribed (or labeled) training data, much more data becomes available for training. With more training data available to cover a particular feature space, the accuracy of a deployed (student) DNN model is even further improved. This advantage is especially useful for industry scenarios with large amounts of un-labeled data available due to the deployment feedback loop (wherein deployed models provide their usage data to application developers, who use the data to further tailor future versions of the application). For example, many search engines use such a deployment feed-back loop.

Turning now to FIG. 1, a block diagram is provided showing aspects of one example of a system architecture suitable for implementing an embodiment of the invention and designated generally as system 100. It should be understood that this and other arrangements described herein are set forth only as examples. Thus, system 100 represents only one example of suitable computing system architectures. Other arrangements and elements (e.g., user devices, data stores, etc.) can be used in addition to or instead of those shown, and some elements may be omitted altogether for the sake of clarity. Further, many of the elements described herein are functional entities that may be implemented as discrete or distributed components or in conjunction with other components, and in any suitable combination and location. Various functions described herein as being performed by one or more entities may be carried out by hardware, firmware, and/or software. For instance, various functions or services may be carried out by a processor executing instructions stored in memory.

Among other components not shown, system 100 includes network 110 communicatively coupled to one or more data source(s) 108, storage 106, client devices 102 and 104, and DNN model generator 120. The components shown in FIG. 1 may be implemented on or using one or more computing devices, such as computing device 700 described in connection to FIG. 7. Network 110 may include, without limitation, one or more local area networks (LANs) and/or wide area networks (WANs). Such networking environments are commonplace in offices, enterprise-wide computer networks, intranets, and the Internet. It should be understood that any number of data sources, storage components or data stores, client devices and DNN model generators may be employed within the system 100 within the scope of the present invention. Each may comprise a single device or multiple devices cooperating in a distributed environment. For instance, the DNN model generator 120 may be provided via multiple computing devices or components arranged in a distributed environment that collectively provide the functionality described herein. Additionally, other components not shown may also be included within the network environment.

Example system 100 includes one or more data source(s) 108. Data source(s) 108 comprise data resources for training the DNN models described herein. The data provided by data source(s) 108 may include labeled and un-labeled data, such as transcribed and transcribed data. For example, in an embodiment, the data includes one or more phone sets (sounds) and may also include corresponding transcription information or senone labels that may be used for initializing the teacher DNN model. In an embodiment, the unlabeled data in data source(s) 108 is provided by one or more deployment-feedback loops, as described above. For example, usage data from spoken search queries performed on search engines may be provided as un-transcribed data. Other examples of data sources may include by way of example and not limitation, various spoken-language audio or image sources, including streaming sounds or video, web queries; mobile device camera or audio information, web cam feeds, smart-glasses and smart watch feeds, customer care systems; security camera feeds, web documents; catalogs; user feeds; SMS logs; instant messaging logs; spoken-word transcripts; gaming system user interactions such as voice commands or captured images (e.g. depth camera images), tweets, chat or video-call records, or social-networking media. Specific data source(s) 108 used may be determined based on the application including whether the data is domain-specific data (e.g., data only related to entertainment systems, for example) or general (non-domain-specific) in nature.

Example system 100 includes client devices 102 and 104, which may comprise any type of computing device where it is desirable to have a DNN system on the device, and in particular wherein the device has limited computational and/or storage resources as compared to a more powerful server or computing system. For example, in one embodiment, client devices 102 and 104 may be any type of computing device described in relation to FIG. 7 herein. By way of example and not limitation, a user device may be embodied as a personal data assistant (PDA), a mobile device, smart phone, smart watch, smart classes (or other wearable smart device), a laptop, a tablet, remote control, entertainment system, vehicle computer system, embedded system controller, appliance, home computer system, security system, consumer electronic device, or other similar electronics device. In one embodiment, the client device is capable of receiving input data such as audio and image information usable by a DNN system described herein that is operating in the device. For example the client device may have a microphone or line-in for receiving audio information, a camera for receiving video or image information, or a communication component (e.g. Wi-Fi functionality) for receiving such information from another source, such as the Internet or a data source 108.

Using an embodiment of the student DNN model described herein, the client device 102 or 104 and student DNN model process the inputted data to determine computer-usable information. For example, using one embodiment of a student DNN operating on a client device, a query spoken by a user may be processed to determine the user's intent (i.e. what the user is asking for). Similarly, camera-derived information may be processed to determine shapes, features, objects, or other elements in the image or video.

Example client devices 102 and 104 are included in system 100 to provide an example environment wherein student (or smaller-sized) DNN models created by embodiments of the invention may be deployed on one or more client devices 102 and 104. Although, it is contemplated that aspects of the DNN models described herein may operate on one or more client devices 102 and 104, it is also contemplated that some embodiments of the invention do not include client devices. For example, a standard-size or larger size student DNN may be embodied on a server or in the cloud. Further, although FIG. 1 shows two example client devices 102 and 104, more or fewer devices may be used.

Storage 106 generally stores information including data, computer instructions (e.g. software program instructions, routines, or services), and/or models used in embodiments of the invention described herein. In an embodiment, storage 106 stores data from one or more data source(s) 108, one or more DNN models (or DNN classifiers), information for generating and training DNN models, and the computer-usable information outputted by one or more DNN models. As shown in FIG. 1, storage 106 includes DNN models 107 and 109. DNN model 107 represents a teacher DNN model, and DNN model 109 represents a student DNN model having a smaller size than teacher DNN model 107. Additional details and examples of DNN models are described in connection to FIGS. 2-4. Although depicted as a single data store component for the sake of clarity, storage 106 may be embodied as one or more information stores, including memory on client device 102 or 104, DNN model generator 120, or in the cloud.

DNN model generator 120 comprises an accessing component 122, an initialization component 124, a training component 126, and an evaluating component 128. The DNN model generator 120, in general, is responsible for generating DNN models, such as the CD-DNN-HMM classifiers described herein, including creating new DNN models (or adapting existing DNN models) by initializing and training "student" DNN models from trained teacher DNN models, based on data from data source(s) 108. The DNN models generated by generator 120 may be deployed on client device such as device 104 or 102, a server, or other computer system. In one embodiment, DNN model generator 120 creates a reduced-size CD-DNN-HMM classifier for deployment on a client device, which may have limited computational or storage resources, by training an initialized "student" DNN model to approximate a trained teacher DNN model having a larger model size (e.g. number of parameters) than the student. In another embodiment, DNN model generator 120 creates a DNN classifier for deployment on a client device, server, or other computer system, by training an initialized "student" DNN model to approximate a trained giant-sized teacher DNN model having a larger model size (e.g. number of parameters) than the student, wherein the giant-sized teacher DNN model comprises an ensemble of other DNN models.

DNN model generator 120 and its components 122, 124, 126, and 128 may be embodied as a set of compiled computer instructions or functions, program modules, computer software services, or an arrangement of processes carried out on one or more computer systems, such as computing device 700, described in connection to FIG. 7, for example. DNN model generator 120, components 122, 124, 126, and 128, functions performed by these components, or services carried out by these components may be implemented at appropriate abstraction layer(s) such as the operating system layer, application layer, hardware layer, etc. of the computing system(s). Alternatively, or in addition, the functionality of these components, generator 120 and/or the embodiments of the invention described herein can be performed, at least in part, by one or more hardware logic components. For example, and without limitation, illustrative types of hardware logic components that can be used include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), etc.

Continuing with FIG. 1, accessing component 122 is generally responsible for accessing and providing to DNN model generator 120, training data from one or more data sources 108 and DNN models, such as DNN models 107 and 109. In some embodiments, Accessing component 122 may access information about a particular client device 102 or 104, such as information regarding the computational and/or storage resources available on the client device. In some embodiments, this information may be used to determine the optimal size of a DNN model generated by DNN model generator 120 for deployment on the particular client device.

Initialization component 124 is generally responsible for initializing an untrained "student" DNN model, and in some embodiments initializing a teacher DNN model for training the student. In some embodiments, initialization component 124 initializes a student DNN model of a particular size (or a model no larger than a particular size) based on the limitations of the client device on which the trained student DNN model will be deployed, and may initialize the student DNN based on a teacher DNN model (a larger DNN model). For example, in an embodiment, initialization component 124 receives from accessing component 122 a fully trained teacher DNN of size $N_T$, which is already trained according to techniques known by one skilled in the art, and information about the limitations of a client device on which the trained student DNN is to be deployed. The teacher DNN may be initialized and/or trained for a domain-specific application (such as facial recognition or spoken-queries for an entertainment system) or for a general purpose. Based on the received information, initialization component 124 creates an initial, untrained student DNN model of a suitable model size (based on the limitations of the client device). In one embodiment, the student DNN model may be created by copying and dividing the teacher DNN model into a smaller model (smaller number of nodes.) Like the teacher DNN model, the untrained student DNN model includes a number of hidden layers that may be equal to the number of layers of the teacher or the student DNN may contain a different number of hidden layers than the teacher DNN model. In one embodiment the student DNN model size, including the number or nodes or parameters for each layer, is less than $N_T$, the size of the teacher. An example DNN model suitable for use as a student DNN or is described in connection to FIG. 2. In that example, a CD-DNN-HMM model inherits its model structure, including a phone set, HMM topology, and tying of context-dependent states, directly from a conventional CD-GMM-HMM system, which may be pre-existing.

In one embodiment, initialization component 124 creates and initializes the untrained student DNN model by assigning random numbers to the weights of the nodes in the model (i.e. the weights of matrix W). In another embodiment, initialization component 124 receives from accessing component 122 data for pre-training the student DNN model, such as un-transcribed data that is used to establish initial node weights for the student DNN model.

In some embodiments, initialization component 124 also initializes or creates the teacher DNN model. In particular, using labeled or transcribed data from data source(s) 108 provided by accessing component 122, initialization component 124 may create a teacher DNN model (which may be pre-trained), and provide the initialized but untrained teacher DNN model to training component 126 for training. Similarly, initialization component 124 may create an ensemble teacher model by determining a plurality of sub-DNN models (e.g., creating and handing off to training component 126 for training or identifying already existing DNN model(S)) to be included as members of the ensemble). In these embodiments, initialization component 124 may also determine the relationships between the output layer of the ensemble and the output layers of the member sub-DNN models (e.g. by taking a raw average of the member model outputs), or may provide the initialized but untrained ensemble teacher DNN to training component 126 for training.

Training component 126 is generally responsible for training the student DNN based on the teacher. In particular training component 126 receives from initialization component 124 and/or accessing component 122, an untrained (or pre-trained) DNN model, which will be the student and trained DNN model, which will serve as the teacher. Training component 126 also receives un-labeled data for training the student DNN from accessing component 112.

Training component 126 facilitate the learning of the student DNN through an iterative process with evaluation component 128, that provides the same un-labeled data to the teacher and student DNN models, evaluates the output distributions of the DNN models to determine the error of the student DNN's output distribution from the teacher's, performs back propagation on the student DNN model based on the error to update the student DNN model, and repeats this cycle until the output distributions converge (or are otherwise sufficiently close). In some embodiments training component 126 trains the student DNN according to methods 500 and 600, described in connection to FIGS. 5 and 6.

In some embodiments training component 126 also trains the teacher DNN model. For example, in one embodiment a teacher DNN is trained using labeled (or transcribed) data according to techniques known to one skilled in the art. In some embodiments using an ensemble teacher DNN, training component 126 trains the ensemble teacher DNN. By way of example and not limitation, training component 126 may train the ensemble by combining the ensemble member outputs with automatically learned combination coefficients using, for example, cross-entropy criterion, sequential criterion, least square error criterion, least square error criterion with nonnegative constraint, or similar criteria.

Evaluating component 128 is generally responsible for evaluating the student DNN model to determine if it is sufficiently trained to approximate the teacher. In particular, in an embodiment, evaluating component 128 evaluates the output distributions of the student and teacher DNNs, determines the difference (which may be determined as an error signal) between the outputs and also determines whether the student is continuing to improve or whether the student is no longer improving (i.e. the student output distribution shows no further trend towards convergence with the teacher output). In one embodiment, evaluating component 128 computes the Kullback-Leibler (KL) divergence between the output distributions, and in conjunction with training component 126, seeks to minimize the divergence through the iterative process described in connection to training component 126. Some embodiments of evaluator 128 may use regression or other similar approaches to minimizing divergence between the outputs of the teacher and student DNNs.

In addition to determining the error signal, some embodiments of evaluating component 128 determine whether to complete another iteration (for example, another iteration comprising: updating the student DNN based on the error, passing un-labeled data through the student and teacher DNNs, and evaluating their output distributions). In particular, some embodiments of evaluating component 128 apply a threshold to determine convergence of the teacher DNN and student DNN output distributions. Where the threshold is not satisfied, iteration may continue, thereby further training the student to approximate the teacher. Where the threshold is satisfied, then convergence is determined (indicating the student output distribution is sufficiently close enough to the teacher DNN's output distribution) and the student DNN may be considered trained and further may be deployed on a client device or computer system. Alternatively, in some embodiments evaluating component 128 determines whether to continue iterating based on whether the student is continuing to show improvement (i.e. whether over multiple successive iterations, the output distribution of the student is moving towards convergence with the output distribution of the teacher, indicating that the student DNN is continuing to improve with subsequent iterations). In such embodiments, so long as the student is improving, the iterative training continues. But in one embodiment, where the student learning stalls (i.e. the student DNN output distributions are not getting any closer to the teacher DNN's output distributions for several iterations), then "class is over" and the student DNN model may be considered trained. In one embodiment, convergence may be determined where the student DNN output distributions are not getting any closer to the teacher DNN's output distributions over several iterations. In some embodiments evaluating component 128 evaluates the student DNN according to the methods 500 and 600, described in connection to FIGS. 5 and 6.

Figure 2:
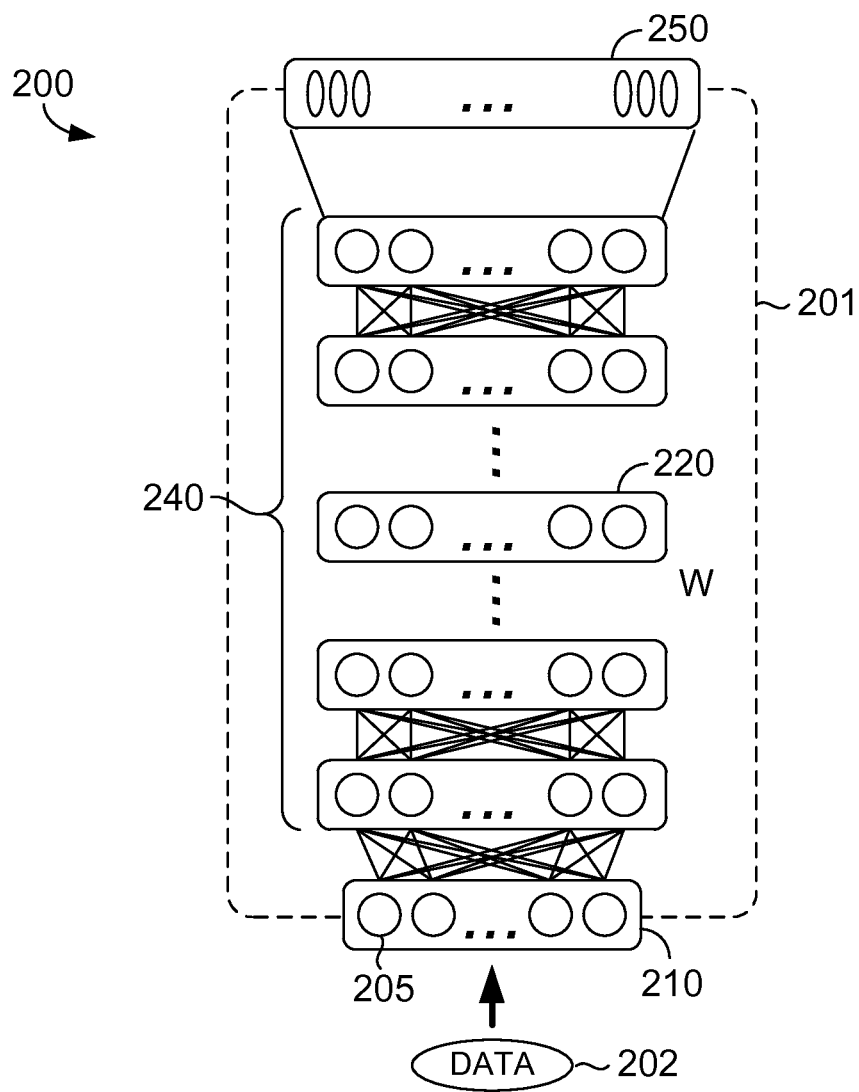
FIG. 2 depicts aspects of an illustrative representation of a DNN model, in accordance with an embodiment of the invention.

Turning now to FIG. 2, aspects of an illustrative representation of an example DNN classifier are provided and referred to generally as DNN classifier 200. This example DNN classifier 200 includes a DNN model 201. (FIG. 2 also shows data 202, which is shown for purposes of understanding, but which is not considered a part of DNN classier 200.) In one embodiment, DNN model 201 comprises a CD-DNN-HMM model and may be embodied as a specific structure of mapped probabilistic relationships of an input onto a set of appropriate outputs, such as illustratively depicted in FIG. 2. The probabilistic relationships, (shown as connected lines between the nodes 205 of each layer) may be determined through training. Thus in some embodiments of the invention, the DNN model is defined according to its training. (An untrained DNN model therefore maybe considered to have a different internal structure than the same DNN model that has been trained.) A deep neural network (DNN) can be considered as a conventional multi-layer perceptron (MLP) with many hidden layers (thus deep). In some embodiments of the invention, three aspects contributing to the excellent performance of CD-DNN-HMM include: modeling senones directly even though there might be thousands of senones; using DNNs instead of shallow MLPs; and using a long context window of frames as the input.

With reference to FIG. 2, the input and output of DNN model 201 are denoted as x and o (210 and 250 of FIG. 2), respectively. Denote the input vector at layer l (220 of FIG. 2) as $v^l$ (with $v^0 = x$), the weight matrix as $W^l$, and bias vector as $a^l$. Then for a DNN with L hidden layers (240 of FIG. 2), the output of the l-th hidden layer is:

$$v^{l+1} = \sigma(z(v^l)), 0 \le l < L$$

where $z(v^l) = W^l v^l + a^l$ and $\sigma(x) = 1/(1+e^x)$ is the sigmoid function applied element-wise. The posterior probability is $$P(o=s|x) = \text{softmax}(z(v^L)),$$

where s belongs to the set of senones (also known as the tied triphone states).

From this, the HMM's state emission probability density function $p(x|o=s)$ may be computed by converting the state posterior probability $P(o=s|x)$ to $$p(x|o=s) = \frac{P(o=s|x)}{P(o=s)} \cdot p(x), \quad (1)$$

where P(o=s) is the prior probability of state s, and p(x) is independent of state and can be dropped during evaluation.

In some embodiments of the invention, the CD-DNN-HMM (DNN model 201) inherits a model structure, including the phone set, the HMM topology, and tying of context-dependent states, directly from a CD-GMM-HMM system, which may be pre-determined. Further, in an embodiment, the senone labels used for training the DNNs may be extracted from the forced alignment generated using the CD-GMM-HMM. In some embodiments a training criterion (suitable for pre-training the student DNN or training the teacher DNN ?), is to minimize cross entropy which is reduced to minimize the negative log likelihood because every frame has only one target label $s_t$:

$$-\Sigma_t \log(P(s_t|x_t)) \quad (1)$$

The DNN model parameters may be optimized with back propagation using stochastic gradient descent or a similar technique known to one of ordinary skill in the art.

Figure 3:
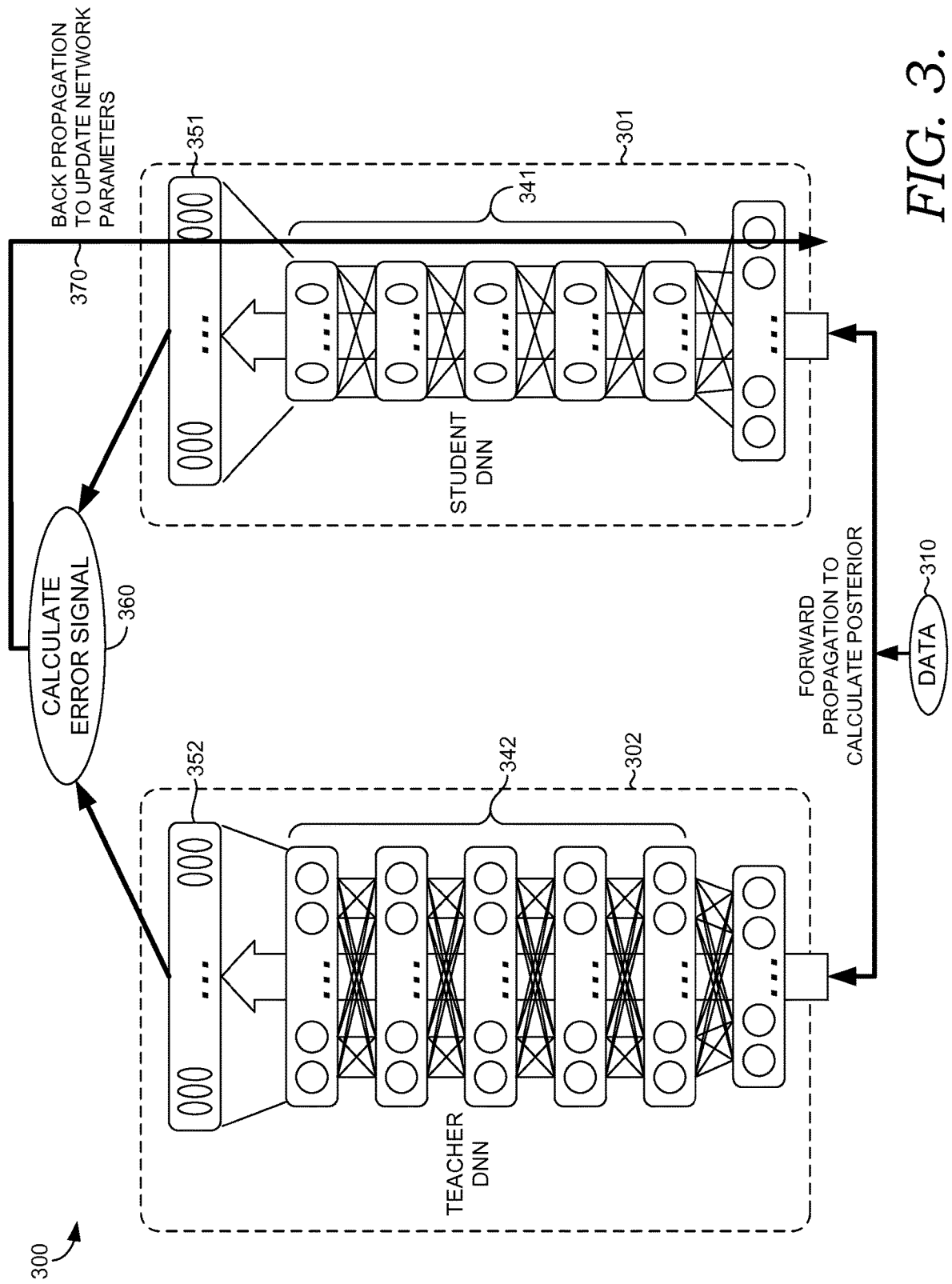
FIG. 3 depicts aspects of an illustrative representation of learning a smaller-footprint student DNN from a larger-footprint teacher DNN using un-labeled data, in accordance with an embodiment of the invention.

Turning now to FIG. 3, aspects of a system 300 for learning a smaller student DNN from a larger teacher DNN are illustratively provided, in accordance with an embodiment of the invention. Example system 300 includes teacher DNN 302 and a smaller student DNN 301, which is depicted as having fewer nodes on each of its layers 341. As described previously, in one embodiment of the invention teacher DNN 302 comprises a trained DNN model, which may be trained according to standard techniques known to one of ordinary skill in the art (such as the technique described in connection to FIG. 2). In another embodiment, a teacher DNN may be trained such as described in connection to the trainer component 126 of FIG. 1. In either case, it is assumed that there is a good teacher (i.e. a trained teacher DNN) from which to learn the student DNN. Further, student DNN 301 and teacher DNN 302 may be embodied as a CD-DNN-HMM having a number of hidden layers 341 and 342, respectively. In the embodiment shown in FIG. 3, student DNN 301 has output distribution 351, and teacher DNN 302 has output distribution 302 of the same size, although the student DNN 301 itself is smaller than teacher DNN 302.

Initially, student DNN 301 is untrained or may be pre-trained, but has not yet been trained by the teacher DNN. In an embodiment, system 300 may be used to learn student DNN 301 from teacher DNN 302 using an iterative process until the output distribution 351 of student DNN 301 converges (or otherwise approximates) output distribution 352 of teacher DNN 302. In particular, for each iteration, a small piece of unlabeled (or un-transcribed) data 310 is provided to both student DNN 301 and teacher DNN 302. Using forward propagation, the posterior distribution (output distribution 351 and 352) is determined. An error signal 360 is then determined from the distribution 351 and 352. The error signal may be calculated by determining the KL divergence between distributions 351 and 352, or by using regression, or other suitable technique, and may be determined using evaluating component 128 of FIG. 1. (The term signal as in "error signal" is a term of the art and does not mean that the error signal comprises a transitory signal such as a propagated communications signal. Rather, in some embodiments, error signal comprises a vector.) Embodiments that determine the KL divergence provide an advantage over other alternatives such as regression because minimizing the KL divergence is equivalent to minimizing the cross entropy of the distributions, as further described in method 500 of FIG. 5. If the output distribution 351 of student DNN 301 has converged with the output distribution 352 of teacher DNN 302, then the student DNN is deemed to be trained.

However, if the output has not converged, and in some embodiments the output still appears to be converging, then the student DNN 301 is trained based on the error. For example, as shown at 370, using back propagation the weights of student DNN 301 are updated using the error signal.

As previously described, some embodiments may determine convergence using a threshold, wherein the distribution 351 of the student DNN 301 is determined to have converged with the distribution 352 of the teacher DNN 302 where the error is below a specified threshold, which may be pre-determined and also may be based on the specific application of the DNNs (or the type of data 310 used by the DNNs) or the size of the student DNN. For example, it is expected that a student DNN that has close to the same number of parameters as the teacher DNN will reach better convergence (lower error signal and thus higher accuracy) than a student DNN that is much smaller than the teacher DNN. System 300 may also determine convergence or otherwise stop iterating where it is determined that the error signal is no longer getting smaller over subsequent iterations. In other words, the student has learned all that it can from the teacher, for the available data.

Figure 4:
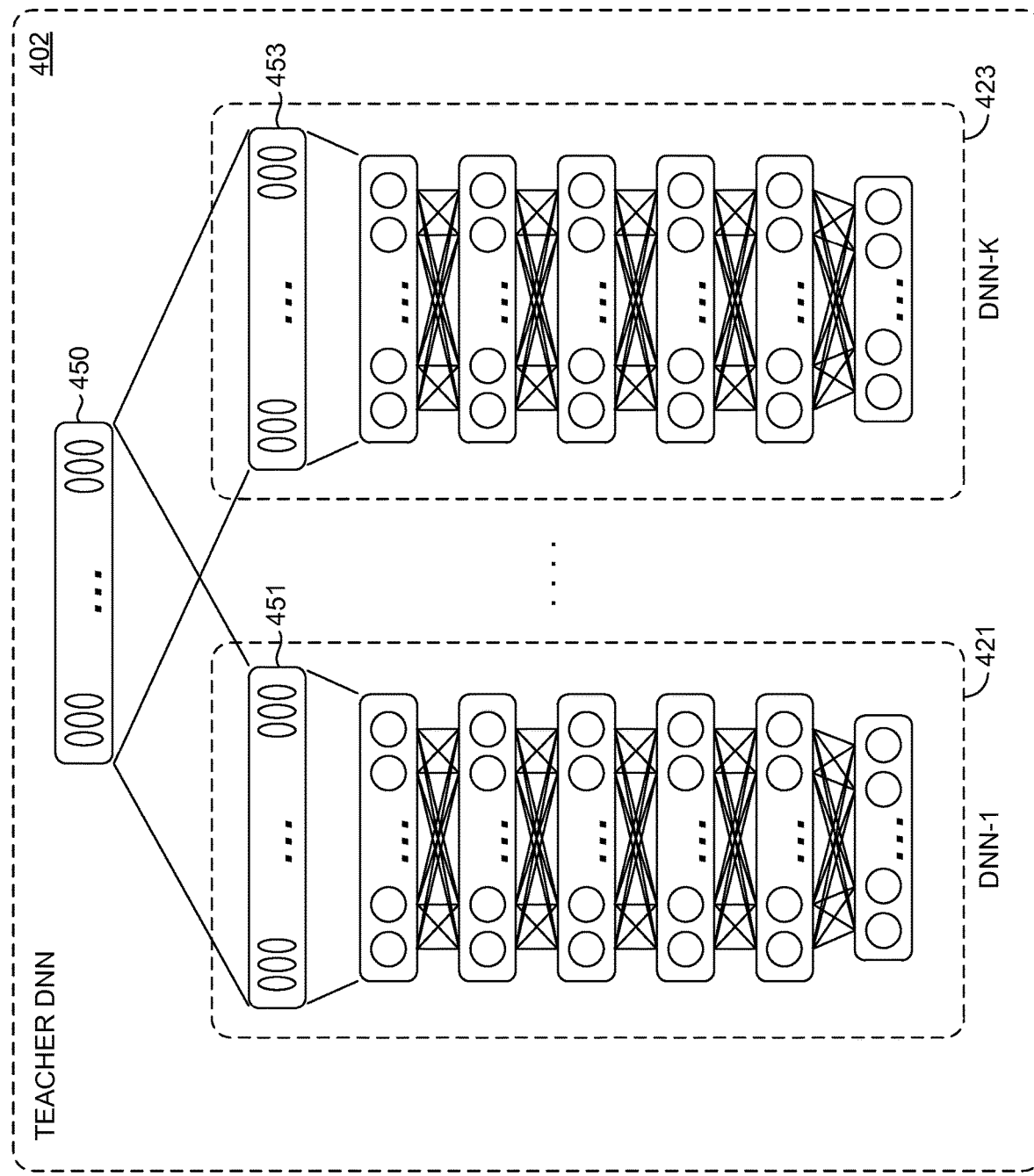
FIG. 4 depicts aspects of illustrative representation of an ensemble teacher DNN model, in accordance with an embodiment of the invention.

Turning to FIG. 4, aspects of one example embodiment of a teacher DNN 402 are provided. Teacher DNN 402 comprises an ensemble teacher DNN model. The ensemble DNN model includes a plurality of sub-DNNs shown as sub-DNN-1 421 to sub-DNN-K 423. (Only two sub-DNNs are shown for clarity, it is contemplated that embodiments of ensemble teacher DNN models may include two or more sub-DNNs, for example one embodiment may include dozens (or more) sub-DNNs.) An advantage of an ensemble teacher DNN is that the output of the trained ensemble is even more accurate because it includes all the voices of the ensemble members (the sub-DNNs). In one embodiment ensemble teacher DNN 402 comprises a huge ensemble DNN that might even be too large to even be practically deployed other than for purposes of training a smaller student DNN, which may be deployed on a server, client device, or other computing device.

In some embodiments, the ensemble sub-DNNs, such as DNN-1 421 and DNN-K 423, may be DNNs with different nonlinear units (e.g., Sigmoid, Rectifer, Maxout, or other units), different structures (e.g., standard feedforward DNN, convolutional neural network (CNN), recurrent neural network (RNN), long short-term memory RNN, or other structures), different training strategies (e.g., standard training, dropout with different factors, or other strategies), different topologies (varying in number of layers and nodes, for example), and/or trained with different data. Such variations result in different error patterns and thus provide a better teacher DNN. As shown in FIG. 4, the output 450 of the ensemble network (teacher DNN 402) is still a posterior vector, with the same dimension as the output of each of its sub-DNNs, such as output 451 of sub-DNN-1 421 and output 453 of sub-DNN-K 423. In some embodiments specific sub-DNN models that are members of the ensemble may be determined based on the availability of DNN models to function as sub-DNNs for the ensemble; the application, application environment, or runtime environment of the ensemble DNN or that of a student DNN to be trained by the ensemble DNN; the available training data; or the data that is expected to be inputted into a student DNN trained by the ensemble DNN, for example. In these embodiments, initialization component 124 of FIG. 1 (or a similar service) may determine the specific sub-DNNs to be included in the ensemble.

The outputs of the sub-DNNs may be combined into output 450 by a raw average, by weighted voting (for example, if it is known that certain sub-DNNs perform better for certain applications or domains, such as entertainment and assign higher weight to those sub-DNNs), or by an objective function that trains the ensemble. In particular, the connections between each sub-DNN output and the final output layer 450 may be trained using one or more criteria, for example, by combining the output posterior vector from each sub-DNN with automatically learned combination coefficients using, by way of example and not limitation, cross-entropy criterion, sequential criterion, least square error criterion, least square error criterion with nonnegative constraint, or similar criteria. In one embodiment, ensemble teacher DNN 402 is trained by training component 126 of FIG. 1.

Figure 5:
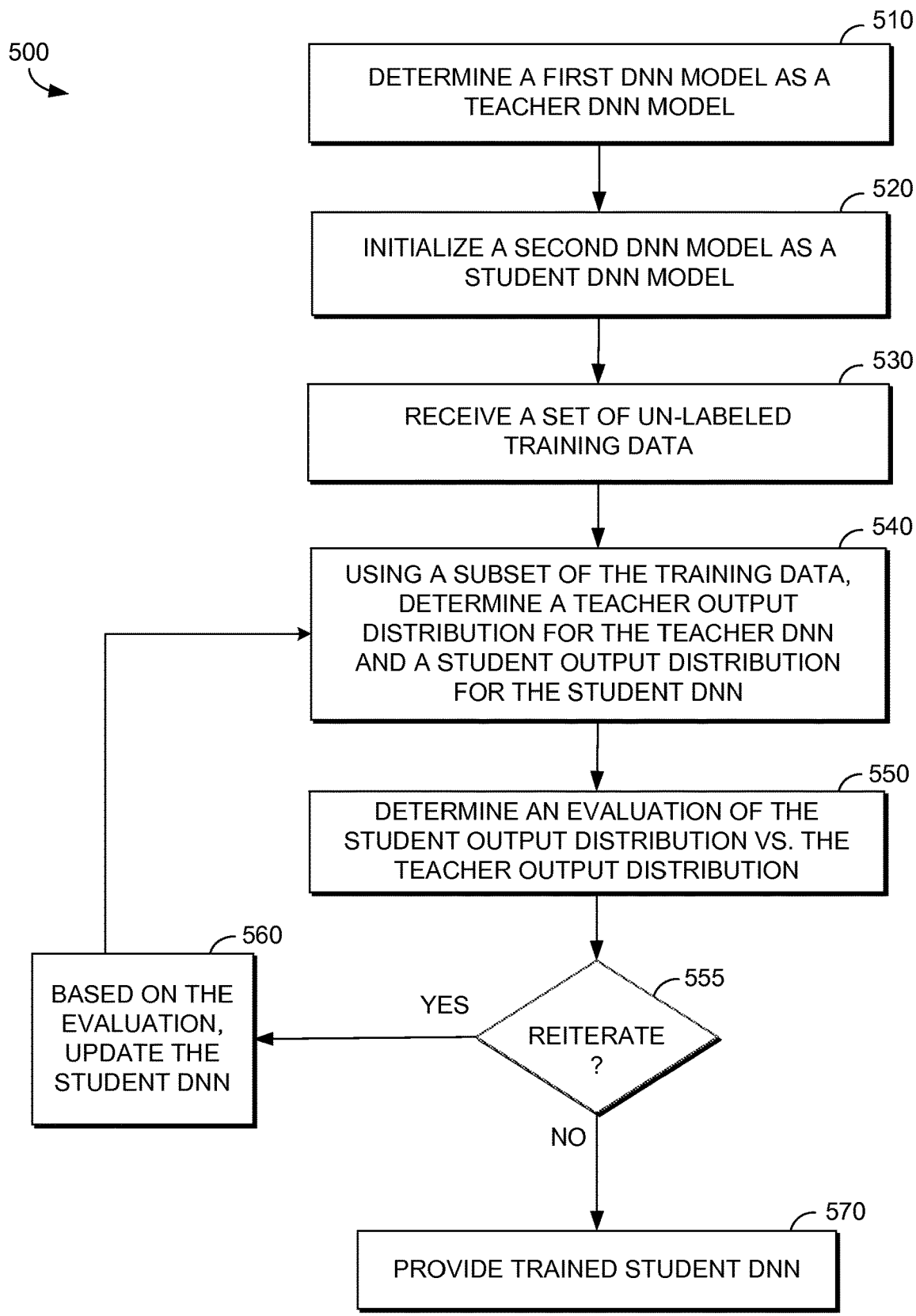
FIG. 5 depicts a flow diagram of a method for generating a DNN classifier of a reduced size by learning from a larger DNN model, in accordance with embodiments of the invention.

Turning now to FIG. 5, a flow diagram is provided illustrating one exemplary method 500 for generating a DNN classifier of a reduced size for deployment on a computer system by learning a smaller DNN model from a larger DNN model. In method 500, the smaller DNN model takes on the role of a student DNN, while the larger DNN serves as a "teacher," which the smaller DNN is trained to approximate. Embodiments of method 500 may be carried out using the components (including the DNN models) described in FIGS. 1-4.

At a high level, one embodiment of method 500 iteratively optimizes the student DNN, based on the difference between its output and the teacher's output, until it converges with the teacher DNN. In this way, the student DNN approaches the behavior of the teacher, so that whatever the output of the teacher, the student will approximate, even where the teacher may be wrong. Once trained, the student DNN model may be deployed as a classifier on a computer system, such as a smart phones, entertainment systems, or similar consumer electronics devices with limited computational or storage resources as compared to the computer system supporting the teacher DNN model.

At a step 510, a first DNN model is determined. The first DNN model serves as a teacher DNN for training a "student" DNN in later steps of method 500. The first DNN model or "teacher DNN" may be determined based on the intended application for the student DNN, when deployed as a classifier on a computing device. For example, the teacher DNN may be specialized for ASR, if the trained student DNN is intended to be deployed as part of an ASR system on a mobile device, for example. In one embodiment, the determined teacher DNN is already trained, and may be accessed from storage by an accessing component such as accessing component 122 of FIG. 1. In another embodiment, the determined teacher DNN is initialized (which may be performed using initialization component 124 of FIG. 1) and trained (which may be performed using training component 126 of FIG. 1). In one embodiment where the teacher DNN is trained in step 510, labeled or transcribed data may be used according to techniques known in the art of DNN model training, such as using gradient-based optimization or unsupervised greedy layer-wise training procedure. In one embodiment the teacher DNN model is trained through an iterative process of applying forward propagation of the labeled data, comparing the output distribution with the label information to determine an error, updating the parameters of the DNN, and repeating until the error is minimized.

Figure 6:
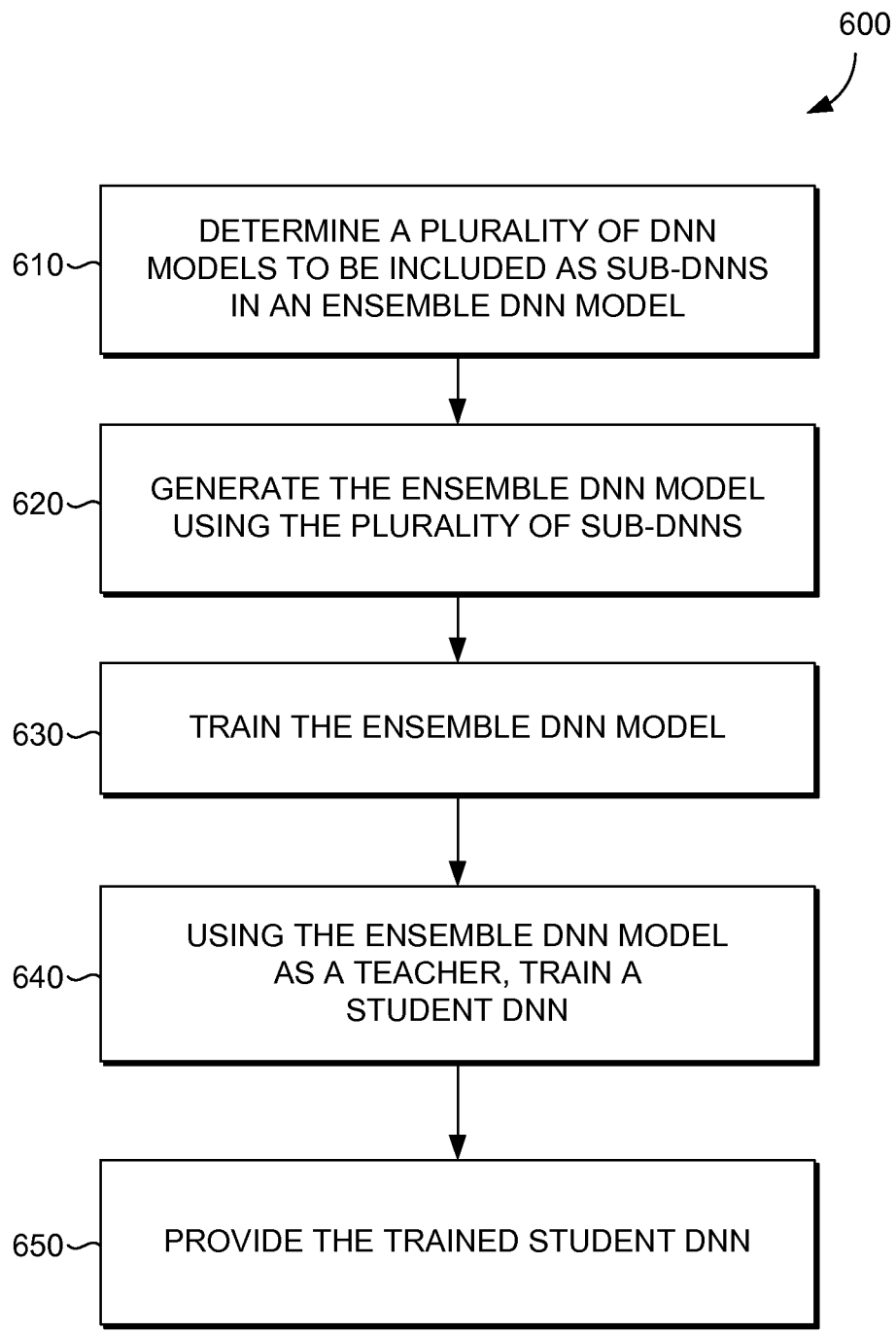
FIG. 6 depicts a flow diagram of a method for generating a trained DNN model from an ensemble teacher DNN model, in accordance with embodiments of the invention.

In one embodiment the teacher DNN comprises a CD-DNN-HMM. Alternatively, the teacher DNN may use non-linear units (e.g., Sigmoid, Rectifier, Maxout, or other units), have structure such as standard feedforward DNN, convolutional neural network (CNN), recurrent neural network (RNN), long short-term memory RNN, or other structure, be trained according to various training strategies (e.g., standard training, dropout with different factors, or other strategies), for example. In one embodiment of step 510, the teacher DNN model comprises an ensemble model comprising a plurality of sub-DNN models. In such embodiments, the ensemble DNN model may be determined as described in connection to FIG. 4 and steps 610-630 of method 600 (FIG. 6).

At step 520 a second DNN model is initialized. The second DNN model serves as a "student DNN" for learning from the teacher DNN determined in step 510. In some embodiments, the second DNN or "student DNN" is created and/or initialized by an initialization component as described in connection to initiation component 124 of FIG. 1. For example, in step 520 the student DNN may be created (or otherwise determined, if a pre-existing student DNN model is used) as having smaller size (e.g., fewer number of parameters or nodes per layer) than the teacher DNN and may also have a different number of hidden layers than the teacher DNN. In some embodiments, the size of the student DNN is determined based on the client device on which the trained student DNN will be deployed as a classifier; for example, based on the computational and storage limitations of the client device. The student DNN may also be determined based on the intended application (e.g., ASR, image processing, etc.) of the trained student DNN when deployed as a classifier.

In one embodiment at step 520, the student DNN is created by copying and dividing the teacher DNN determined in step 510 to create a student DNN of reduced dimension. The student DNN may be initialized by receiving training data and performing unsupervised pre-training of student DNN model, in an embodiment. For example, un-transcribed data may be received and used to establish initial node weights for the student DNN model (i.e. the weights of a matrix W, such as described in connection to FIG. 2). In another embodiment, step 520 includes initializing an untrained student DNN model by assigning random numbers to the weights of the nodes in the model. In one embodiment, the student DNN model is created or initialized to inherit a model structure, including a phone set, HMM topology, and tying of context-dependent states, from a conventional CD-GMM-HMM system, which may be pre-existing.

At step 530, a set of un-labeled data is received for training the student DNN initialized in step 520. The un-labeled data may be received by an accessing component as described in connection to accessing component 122 of FIG. 1. For example, the un-labeled data may be received from storage and/or may be received (or ultimately derived) from a deployment feedback loop. The un-labeled data may comprise un-transcribed data, in one embodiment.

Because a large amounts of un-labeled training data may be available (for example data derived from one or more deployment feedback loops), one embodiment step 530 comprises receiving a large amount of un-labeled data for use in training the student DNN, in subsequent steps of method 500. Although step 530 is shown as a single step in method 500, it is contemplated that un-labeled data for training may be received as needed during the steps of method 500. For example, in one embodiment, with each iteration of steps 540 through 560, a new portion (or subset) of un-labeled data may be received and used for determining the output distributions.

In steps 540 through 560, the student DNN is trained using an iterative process to optimize its output distribution to approximate the output distribution of the teacher DNN; for example, in one embodiment steps 540-560 are repeated until the student output distribution sufficiently converges with (or otherwise becomes close to) the output distribution of the teacher. With each iteration, the student DNN is updated based on the difference or error of its output distribution from that of the teacher DNN, until sufficient convergence is achieved. In some embodiments one or more full sweepings of the training data are used over successive iterations to provide diverse input to the teacher and student DNNs.

At step 540, using a subset of the un-labeled training data received at step 530, the output distribution for the teacher DNN and the output distribution for the student DNN are determined. The output distributions for the teacher DNN and student DNNs may be determined by a training component as described in connection to training component 126 of FIG. 1. In one embodiment the subset of training data comprises a mini-batch, which is inputted into the teacher DNN and the student DNN (the same mini-batch is fed to both DNN models). From this, the output distribution is determined for the teacher DNN and the student DNN. In one embodiment, the mini-batch comprises 256 samples or "frames" of un-transcribed training data.

For example, in one embodiment for each mini-batch, forward propagation is conducted on the teacher and student DNNs to determine the output distributions (posterior distributions). In particular, the posterior distribution for a senone s given input training data x for the teacher DNN and student DNN may be denoted as $P_L(s|x)$ for the teacher or larger DNN (where "L" implies larger) and $P_S(s|x)$ for the student DNN. Accordingly, in an embodiment of step 540, forward propagation is applied to calculate $P_L(s|x)$ and $P_S(s|x)$ for the teacher DNN and student DNN, respectively.

At step 550, the student DNN output distribution is evaluated against the teacher DNN output distribution. The evaluation process of step 550 may be carried out by an evaluating component 128 as described in connection to evaluating component 128 of FIG. 1. In one embodiment of step 550, from the output distributions determined in step 540 (determined from the mini-batch or subset of training data used in step 540), a difference is first determined between the output distribution of the student DNN and the output distribution of the teacher DNN. (The difference may be expressed as an "error" or "error signal" between the student output and the teacher output.) Then, based on that difference, it is determined whether the student DNN output distribution and teacher DNN output distribution have converged. For example, the outputs may be determined to have converged where their difference (or error) is small enough or whether, over several iterations, the difference is no longer getting smaller (implying that the student DNN learning has stalled because its output distribution is no longer trending towards converging with the teacher DNN output distribution).

For example, a threshold (which may be referred to as a convergence or difference threshold) may be applied to determine convergence, based on whether the error signal is small enough (e.g. below the threshold value) indicating that the performance of the student is approximating the performance of the teacher. In other words, the student is now trained, and it is no longer necessary to continue the iterations. In one embodiment the threshold is pre-determined and/or may be based on the size of the student DNN or intended application for the student DNN, when deployed as a classifier on a computing device. Alternatively, the evaluation determined in step 550 may compare the error signals or differences determined over recent iterations of step 540 to determine whether the error signal is getting smaller (implying that the student DNN is continue to improve from the training) or not getting any smaller (implying that the student DNN, or more specifically it's posterior distribution has effectively achieved convergence with the posterior distribution of the teacher DNN.)

Continuing with step 550, the difference between the output distributions may be determined by determining the Kullback-Leibler (KL) divergence between the posterior distributions, by using regression, or by similar techniques for minimizing divergence. (In this instance, minimizing the divergence between the outputs of the teacher and student DNNs.) For example, in one embodiment, where the posterior distributions for the teacher DNN and student DNN are determined as $P_L(s|x)$ and $P_S(s|x)$ respectively, for a given set of training data $x_t$, t=1 to T, the KL divergence between these two distributions is:

$$\sum_t \sum_{i=1}^{N} P_L(S_i | x_t) \log\left(\frac{P_L(s_i | x_t)}{P_S(s_i | x_t)}\right) \quad (2)$$

where N is the total number of senones.

Since embodiments of method 500 learn the student DNN to approximate the trained teacher DNN, only the parameters of the student DNN are optimized. Accordingly, minimizing the above KL divergence is equivalent to minimizing the cross entropy:

$$-\sum_t \sum_{i=1}^{N} P_L(s_i | x_t) \log P_S(s_i | x_t) \quad (3)$$

because $P_L(s_i|x_t)\log P_L(s_i|x_t)$ has no impact on the student DNN parameter optimization. The training criterion of Equation (3) above is a general form of the standard DNN training criterion in Equation (1), described in connection to FIG. 2, where for every frame, only one dimension of $P_L(s|x)$ equals to 1 and the others equal to 0. In contrast, in Equation (3) every dimension of $P_L(s|x)$ may have a non-zero (although may be very small) value. (This illustrates why the DNN model generated according to the method described herein is different—is more accurate—than a DNN model trained of the same size but trained according to standard training criteria.) Using KL divergence to determine an error signal between the teacher and student output distributions provides an advantage over other alternatives such as regression because minimizing the KL divergence is equivalent to minimizing the cross entropy of the distributions.

At step 555, based on the evaluation determined in step 550, method 500 proceeds to step 560 or step 570. In particular, if it is determined in step 550 that convergence between the output distribution of the student DNN vs. the teacher DNN has not been achieved; for example, a convergence or difference threshold has not been satisfied, or that the output of the student DNN is continuing to improve), then method 500 proceeds to step 560 where the student DNN is updated based on the error signal (or difference) determined in step 550. However, if it is determined in step 550 that convergence has been reached or that the error signal is no longer getting smaller (implying that the student DNN is no longer improving from training, then method 500 proceeds to step 570. (In other words, "class is over" for the student DNN.)

In one embodiment, step 555 also determines whether a full sweeping of the training data has occurred yet. If it has (if all of the training data has been used at least once) and convergence is reached (or the error signal is no longer getting smaller), then method 500 proceeds to 570. But if all of the data has not yet been applied, then method 500 proceeds to step 560 and reiterates, in this embodiment.

At step 560, the student DNN is updated based on the evaluation determined at step 550. The student DNN may be updated by a training component as described in connection to training component 126 of FIG. 1. In one embodiment, the difference between the output distribution of the student DNN and teacher DNN determined in step 550 is used to update the parameters or node weights of the student DNN, which may be performed using back propagation. Updating the student DNN in this way facilitates training the output distribution of the student DNN to more closely approximate the output distribution of the teacher DNN.

In an embodiment, the output of Equation (3) is used for updating the student DNN through back propagation. For each iteration, back propagation may be applied using the output of equation (3) to update the student DNN thereby further training the student DNN to approximate the teacher. Following step 560, method 500 proceeds back to step 540, where a subset (or mini-batch) of the training data is used to determine an output distribution for the teacher DNN and the now-updated student DNN. In one embodiment, with each iteration a new sub-set or mini-batch is used in step 540 until all of the data in the set of un-labeled training data (received in step 530) is used. A full sweeping of the training data may be applied before the training data is recycled.

At step 570, the trained student DNN is provided. Based on the determination of step 550, the trained student DNN output distribution has sufficiently converged with that of the teacher DNN, or the student DNN is no longer showing signs of improvement. In one embodiment, the trained student DNN is deployed as a DNN classifier on a computing system or computing device, such as client device 102 or 104 of FIG. 1. For example, the trained student DNN may be deployed on a smart phone or smart glasses. Based on the teacher DNN model and the training data, the trained student DNN may be specialized for a specific application (e.g. image processing or ASR) or generalized.

As described previously an advantage of some embodiments of method 500 is that the student DNN may be trained using un-labeled (or un-transcribed data) because its supervised signal ($P_L(s|x)$, which is the output distribution of the teacher DNN) is obtained by passing the un-labeled training data through the teacher DNN model. Without the need for labeled or transcribed training data, much more data becomes available for training. Furthermore, with more training data available to cover a particular feature space, the accuracy of a deployed (student) DNN model is even further improved.

Turning now to FIG. 6, a flow diagram is provided illustrating one exemplary method 500 for generating a trained DNN model for deployment as a classifier on a computer system by learning the DNN model from an ensemble DNN model. In method 600, the ensemble DNN model takes on the role of the "teacher," while the DNN model that is trained takes on the role of the "student." The student DNN model of method 600 may be trained to approximate the ensemble teacher DNN model, in a manner similar to that described in method 500 (FIG. 5). One advantage of the ensemble teacher DNN is that the output of the trained ensemble is even more accurate because it includes all the voices of the ensemble members (sub-DNNs). Embodiments of method 500 may be carried out using the components (including the DNN models) described in FIGS. 1-4. In particular, FIG. 4 describes an embodiment for an ensemble teacher model that is suitable for use in some embodiments of method 600.

At step 610, a plurality of DNN models to be included as sub-DNNs in an ensemble DNN model are determined. The plurality of DNN models may be determined by an initialization component and/or by an accessing component as described in connection to initialization component 124 and accessing component 122 of FIG. 1, and teacher DNN 402 described in connection to FIG. 4. In some embodiments, sub DNNs determined to be included in the ensemble teacher DNN may comprise DNNs or similar structures with different nonlinear units (e.g., Sigmoid, Rectifier, Maxout, or other units), different structure types (e.g., standard feedforward DNN, convolutional neural network (CNN), recurrent neural network (RNN), long short-term memory RNN, or other structures), may be trained according to different training strategies (e.g., standard training, dropout with different factors, or other strategies), have different topologies (varying in number of layers and nodes, for example), and/or may be trained with different data. Such variations can result in different error patterns and thus provide a better teacher DNN.

In some embodiments specific sub-DNN models that are members of the ensemble may be determined based on the availability of DNN models to function as sub DNNs for the ensemble; the application, application environment, or run-time environment of the ensemble DNN or that of a student DNN to be trained by the ensemble DNN; the available training data; or the training data that is expected to be inputted into a student DNN trained by the ensemble DNN, for example. In these embodiments, initialization component 124 of FIG. 1 (or a similar service) may determine the specific sub-DNNs to be included in the ensemble.

At step 620, an ensemble teacher DNN model is generated using the plurality of sub-DNNs determined in step 610. The ensemble teacher DNN model may be generated by an initialization component as described in connection to initialization component 124 of FIG. 1, and, in one embodiment may be similar to the example ensemble teacher DNN model described in connection to FIG. 4. At step 620, the outputs of the ensemble network comprise a posterior vector representing the output distribution (or posterior distribution) of the ensemble teacher DNN model. In one embodiment, the posterior vector has the same dimension as the output of each of the sub-DNNs. In one embodiment ensemble teacher DNN 402 comprises a huge ensemble DNN that might even be too large to even be practically deployed other than for purposes of training a smaller student DNN, which may be deployed on a server, client device, or other computing device.

At step 630, the ensemble teacher DNN is trained. The ensemble teacher DNN model may be trained by a training component as described in connection to training component 126 of FIG. 1, or as described in connection to FIG. 4. In one embodiment, the sub-DNNs are already trained. Alternatively, the sub-DNNs may be trained (such as described in connection to step 510 of method 500) prior to training the ensemble teacher DNN. In one embodiment, step 630 comprises combining the outputs of the sub-DNNs into a vector representing the posterior output distribution for the ensemble by using a raw average of the outputs of the sub-DNNs, by weighted voting (for example, if it is known that certain sub-DNNs perform better for certain applications or domains, such as entertainment and assign higher weight to those sub-DNNs' outputs), or by an objective function. In particular, the connections between each sub DNN output distribution and the vector representing the output distribution for the ensemble may be trained using one or more criteria, such as by combining the output posterior vector from each sub DNN with automatically learned combination coefficients using, cross-entropy criterion, sequential criterion, least square error criterion, least square error criterion with nonnegative constraint, or similar criteria.

At step 640, the ensemble teacher DNN generated and trained in the preceding steps of method 600 is used to train a student DNN. The training may be carried out by a training component as described in connection to training component 126 of FIG. 1. Embodiments of step 640 may be carried out as described in steps 520 through 560 of method 500, wherein the ensemble teacher DNN functions as the teacher DNN of method 500. In some embodiments of step 640, the student DNN is initialized according to step 520 of method 500.

Upon completion of step 640, at step 650 the trained student DNN may be deployed on a computing system. In one embodiment, the trained student DNN is deployed as described in step 570 of method 500. In some embodiments, the student DNN of method 600 comprises a standard size DNN that may be deployed on a computer system such as a server, rather than a client device.

Accordingly, we have described various aspects of technology directed to systems and methods for providing a more accurate DNN classifier of reduced size for deployment on computing devices by "learning" the deployed DNN from a teacher DNN with larger capacity (number of hidden nodes). The DNN classifiers trained in according to some embodiments of the invention, are particularly suitable for providing accurate signal processing applications (e.g. ASR or image processing), on smart phones, entertainment systems, or similar consumer electronics devices with limited computational and storage resources as compared to more powerful servers and computing systems. We have also described embodiments that apply the teacher-student training processes described herein using an ensemble DNN model for the teacher, wherein the ensemble teacher DNN may be trained prior to training the student DNN.

It is understood that various features, sub-combinations and modifications of the embodiments described herein are of utility and may be employed in other embodiments without reference to other features or sub-combinations. Moreover, the order and sequences of steps shown in the example methods 500 and 600 are not meant to limit the scope of the present invention in any way and, in fact, the steps may occur in a variety of different sequences within embodiments hereof. Such variations and combinations thereof are also contemplated to be within the scope of embodiments of the invention.

Having described various embodiments of the invention, an exemplary computing environment suitable for implementing embodiments of the invention is now described. With reference to FIG. 7, an exemplary computing device is provided and referred to generally as computing device 700. The computing device 700 is but one example of a suitable computing environment and is not intended to suggest any limitation as to the scope of use or functionality of the invention. Neither should the computing device 700 be interpreted as having any dependency or requirement relating to any one or combination of components illustrated.

Embodiments of the invention may be described in the general context of computer code or machine-useable instructions, including computer-useable or computer-executable instructions, such as program modules, being executed by a computer or other machine, such as a personal data assistant, a smartphone, a tablet PC, or other handheld device. Generally, program modules, including routines, programs, objects, components, data structures, and the like, refer to code that performs particular tasks or implements particular abstract data types. Embodiments of the invention may be practiced in a variety of system configurations, including handheld devices, consumer electronics, general-purpose computers, more specialty computing devices, etc. Embodiments of the invention may also be practiced in distributed computing environments where tasks are performed by remote-processing devices that are linked through a communications network. In a distributed computing environment, program modules may be located in both local and remote computer storage media including memory storage devices.

Figure 7:
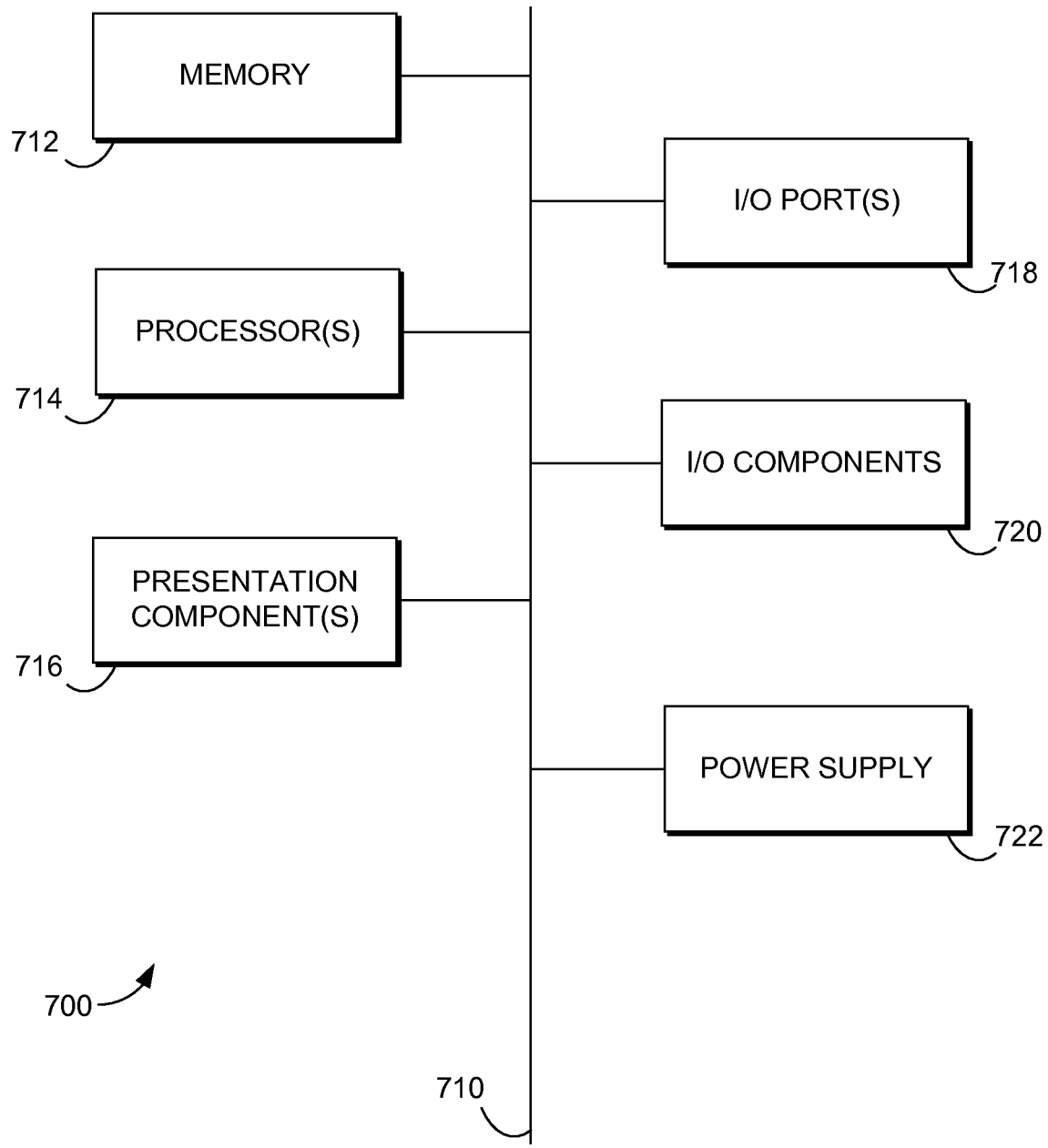
FIG. 7 is a block diagram of an exemplary computing environment suitable for use in implementing embodiments of the present invention.

With reference to FIG. 7, computing device 700 includes a bus 710 that directly or indirectly couples the following devices: memory 712, one or more processors 714, one or more presentation components 716, one or more input/output (I/O) ports 618, one or more I/O components 720, and an illustrative power supply 722. Bus 710 represents what may be one or more busses (such as an address bus, data bus, or combination thereof). Although the various blocks of FIG. 7 are shown with lines for the sake of clarity, in reality, these blocks represent logical, not necessarily actual, components. For example, one may consider a presentation component such as a display device to be an I/O component. Also, processors have memory. The inventors hereof recognize that such is the nature of the art and reiterate that the diagram of FIG. 7 is merely illustrative of an exemplary computing device that can be used in connection with one or more embodiments of the present invention. Distinction is not made between such categories as "workstation," "server," "laptop," "handheld device," etc., as all are contemplated within the scope of FIG. 1 and with reference to "computing device."

Computing device 700 typically includes a variety of computer-readable media. Computer-readable media can be any available media that can be accessed by computing device 700 and includes both volatile and nonvolatile media, removable and non-removable media. By way of example, and not limitation, computer-readable media may comprise computer storage media and communication media. Computer storage media includes both volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVDs) or other optical disk storage, magnetic cassettes, magnetic tape, magnetic disk storage or other magnetic storage devices, or any other medium which can be used to store the desired information and which can be accessed by computing device 700. Computer storage media does not comprise signals per se. Communication media typically embodies computer-readable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media, such as a wired network or direct-wired connection, and wireless media, such as acoustic, RF, infrared, and other wireless media. Combinations of any of the above should also be included within the scope of computer-readable media.

Memory 712 includes computer storage media in the form of volatile and/or nonvolatile memory. The memory may be removable, non-removable, or a combination thereof. Exemplary hardware devices include solid-state memory, hard drives, optical-disc drives, etc. Computing device 700 includes one or more processors 714 that read data from various entities such as memory 712 or I/O components 720. Presentation component(s) 716 presents data indications to a user or other device. Exemplary presentation components include a display device, speaker, printing component, vibrating component, and the like.

The I/O ports 718 allow computing device 700 to be logically coupled to other devices, including I/O components 720, some of which may be built in. Illustrative components include a microphone, joystick, game pad, satellite dish, scanner, printer, wireless device, etc. The I/O components 720 may provide a natural user interface (NUI) that processes air gestures, voice, or other physiological inputs generated by a user. In some instances, inputs may be transmitted to an appropriate network element for further processing. An NUI may implement any combination of speech recognition, touch and stylus recognition, facial recognition, biometric recognition, gesture recognition both on screen and adjacent to the screen, air gestures, head and eye tracking, and touch recognition associated with displays on the computing device 700. The computing device 700 may be equipped with depth cameras, such as stereoscopic camera systems, infrared camera systems, RGB camera systems, and combinations of these, for gesture detection and recognition. Additionally, the computing device 700 may be equipped with accelerometers or gyroscopes that enable detection of motion. The output of the accelerometers or gyroscopes may be provided to the display of the computing device 700 to render immersive augmented reality or virtual reality.

Many different arrangements of the various components depicted, as well as components not shown, are possible without departing from the scope of the claims below. Embodiments of the present invention have been described with the intent to be illustrative rather than restrictive. Alternative embodiments will become apparent to readers of this disclosure after and because of reading it. Alternative means of implementing the aforementioned can be completed without departing from the scope of the claims below. Certain features and subcombinations are of utility and may be employed without reference to other features and subcombinations and are contemplated within the scope of the claims.

Although the subject matter has been described in language specific to structural features and/or acts, it is to be understood that the subject matter defined in the appended claims is not necessarily limited to the specific features or acts described above. Rather, the specific features and acts described above are disclosed as examples of implementing the claims and other equivalent features and acts are intended to be within the scope of the claims.

Accordingly, in one aspect, an embodiment of the invention is directed to one or more computer-readable media having computer-executable instructions embodied thereon that, when executed by a computing system having a processor and memory, cause the computing system to perform a method for generating a DNN classifier for deployment on a computing device. The method includes determining a first DNN model as a teacher DNN model, initializing a second DNN model as a student DNN model, and receiving a set of un-labeled training data. The method also includes, for a number of iterations: (a) using a subset of the set of training data, determine a teacher output distribution for the teacher DNN model and a student output distribution for the student DNN model; (b) determine an evaluation of the student output distribution vs. the teacher output distribution; and (c) based on the evaluation, update the student DNN model. The method further includes providing the student DNN model as a trained DNN classifier, wherein the number of iterations is based on the determined evaluation.

In another aspect, a computer implemented method is provided for generating a trained DNN model for deployment as a classifier on a computer system. The method includes determining a plurality of DNN models to be included as sub-DNNs in an ensemble DNN model, and assembling the ensemble DNN model using the sub-DNNs, thereby making each of plurality of sub-DNNs an ensemble member. The method also includes training the ensemble DNN model. The method also includes initializing a student DNN model, and training the student DNN model, using the trained ensemble DNN model as a teacher DNN. The method further includes providing the student DNN model as a DNN classifier.

In yet another aspect, a DNN-based classifier deployed on a client device and created according to a process is provided. The process includes (a) determining a first DNN model as a teacher DNN model and (b) initializing a second DNN model as a student DNN model. The process also includes (c) receiving a set of un-labeled training data, and (d) using a subset from the set of training data, determining a teacher output distribution for the teacher DNN model and a student output distribution for the student DNN model. The process also includes (e) determining an evaluation of the student output distribution vs. the teacher output distribution. The process further includes (f) based on the evaluation, determining whether the student output distribution and the teacher output distribution have achieved convergence: if the student output distribution and the teacher output distribution are determined to have converged, then providing the student DNN model for deployment on the client device; and if the student output distribution and the teacher output distribution are determined not to have converged, then updating the student DNN model based on the determined evaluation and repeating steps (d) through (f).

What is claimed is:

1. One or more computer-storage media having computer-executable instructions embodied thereon that, when executed by a computing system having a processor and memory, cause the computing system to perform a method for generating a deep neural network (DNN) classifier for deployment on a client device, the method comprising:
   determining a first DNN model as a teacher DNN model;
   determining limitations of the client device on which a student DNN model is to be deployed;
   generating a second DNN model as the student DNN model, wherein the student DNN model is generated to operate within the limitations of the client device by copying and dividing the teacher DNN model into a smaller model having fewer nodes on each layer than the teacher DNN model;
   receiving a set of un-labeled training data; and
   for a number of iterations:
      (a) using a subset of the set of un-labeled training data, determine a teacher posterior output distribution for the teacher DNN model and a student posterior output distribution for the student DNN model,
      (b) using Kullback-Leibler divergence to determine an evaluation of the student posterior output distribution vs. the teacher posterior output distribution, and
      (c) based on the evaluation, updating the student DNN model, thereby providing the student DNN model as a trained DNN classifier, wherein the number of iterations is based on the evaluation, and wherein the student DNN model is embodied in a computer-readable memory.

2. The one or more computer-storage media of claim 1, wherein determining the evaluation of the student posterior output distribution vs. the teacher posterior output distribution comprises determining convergence between the student posterior output distribution and the teacher posterior output distribution, and wherein the number of iterations is the number of times steps (a) through (c) are performed until the convergence is determined.

3. The one or more computer-storage media of claim 1, wherein the evaluation comprises an error signal.

4. The one or more computer-storage media of claim 3, wherein the student DNN model is updated using back-propagation based on the error signal.

5. The one or more computer-storage media of claim 1, wherein the teacher posterior output distribution and the student posterior output distribution are determined by forward propagation using the subset of the set of un-labeled training data.

6. The one or more computer-storage media of claim 1, wherein the first DNN model is determined from an already trained DNN model.

7. The one or more computer-storage media of claim 1, wherein the first DNN model comprises an ensemble DNN model.

8. The one or more computer-storage media of claim 1, wherein the second DNN model is initialized based on the first DNN model, and wherein the second DNN model is pre-trained.

9. The one or more computer-storage media of claim 1, wherein the second DNN model is a context-dependent deep neural network hidden Markov model CD-DNN-HMMI.

10. The one or more computer-storage media of claim 1, wherein the subset of the set of un-labeled training data comprises a mini-batch, and wherein a different mini-batch of data is used for each iteration of the number of iterations until all of the set of un-labeled training data has been used.

11. The one or more computer-storage media of claim 1, wherein the trained DNN classifier for deployment on the client device is reduced in size with respect to the teacher DNN model.

12. A computer implemented method for generating a trained deep neural network (DNN) model for deployment as a classifier on a client device, the method comprising:
   determining a plurality of DNN models having different error patterns to be included as sub-DNNs in an ensemble DNN model;
   assembling the ensemble DNN model using the sub-DNNs, thereby making each of plurality of sub-DNNs an ensemble member;
   training the ensemble DNN model;
   determining one or more limitations of the client device on which the trained DNN model is to be deployed;

generating a student DNN model configured to operate within the one or more limitations of the client device at least in part by copying and dividing the ensemble DNN model into a smaller model having fewer parameters per layer than the ensemble DNN model;

training the student DNN model, using the trained ensemble DNN model as a teacher DNN model, wherein the student DNN model is updated based on using Kullback-Leibler divergence to determine an evaluation of a posterior distribution of the student DNN model vs. a posterior distribution of the ensemble DNN model; and providing the student DNN model as a DNN classifier.

13. The computer-implemented method of claim 12, wherein the plurality of DNN models to be included as sub-DNNs in the ensemble DNN model are determined based on an intended application for the classifier deployed on the client device.

14. The computer-implemented method of claim 12, wherein the sub-DNNs comprise DNN models that (a) have different nonlinear units, (b) have different structure types, (c) are trained according to different training strategies, (d) have different topologies, or (e) are trained with different data.

15. The computer-implemented method of claim 12, wherein training the ensemble DNN model comprises combining output distributions of the ensemble members by a learned combination of coefficients using cross-entropy criterion, sequential criterion, least square error criterion, or least square error criterion with nonnegative constraint.

16. The computer-implemented method of claim 12, wherein training the student DNN model comprises:
 (a) receiving a mini-batch of un-labeled training data;
 (b) using the mini-batch, determining a teacher output distribution for the teacher DNN model and a student output distribution for the student DNN model by forward propagation of the mini-batch in the student DNN model and the teacher DNN model;
 (c) determining an evaluation of the student output distribution vs. the teacher output distribution;
 (d) based on the evaluation, determining whether the student output distribution and the teacher output distribution have achieved convergence:
  (i) if the student output distribution and the teacher output distribution are determined to have converged, then providing the student DNN model for deployment on the client device; and
  (ii) if the student output distribution and the teacher output distribution are determined not to have converged, then updating the student DNN model based on the evaluation and repeating steps (a) through (d).

17. The computer-implemented method of claim 16, wherein the evaluation comprises an error signal, and wherein the student DNN model is updated using back-propagation based on the error signal.

18. The computer-implemented method of claim 16, wherein the student DNN model is a context-dependent deep neural network hidden Markov model LCD-DNN-HMMI, and wherein the mini-batch that is received in step (a) comprises a subset of training data that has not already been used in step (b).

19. A computer implemented method for generating a deep-neural-network-based classifier for deployment on a client device, the method comprising:
 determining a first deep neural network (DNN) model as a teacher DNN model;
 determining one or more limitations of the client device on which a student DNN model is to be deployed;
 determining a model size for the student DNN model based at least in part on the one or more limitations of the client device;
 generating an initial, untrained DNN model as the student DNN model configured to operate within the one or more limitations of the client device at least in part by copying and dividing the teacher DNN model into a smaller model having fewer nodes on each layer than the teacher DNN model;
 receiving a set of un-labeled training data;
 performing an iteration of:
  using a subset from the set of un-labeled training data, determining a teacher posterior output distribution for the teacher DNN model and a student posterior output distribution for the student DNN model,
  using Kullback-Leibler divergence to determine an evaluation of the student posterior output distribution vs. the teacher posterior output distribution,
  based on the evaluation, determining whether the student posterior output distribution and the teacher posterior output distribution have achieved convergence,
  if the student posterior output distribution and the teacher posterior output distribution are determined to have converged, then providing the student DNN model for deployment on the client device, and
  if the student posterior output distribution and the teacher posterior output distribution are determined not to have converged, then updating the student DNN model based on the evaluation and repeating the iteration.

20. The computer implemented method of claim 19, wherein the student DNN model is a context-dependent deep neural network hidden Markov model CD-DNN-HMMI, wherein the evaluation comprises an error signal, wherein the student DNN model is updated using back-propagation based on the error signal, and wherein the DNN-based classifier is deployed on the client device as part of an automatic speech recognition system.

* * * * *